(12) United States Patent
Zeidman

(10) Patent No.: US 8,261,237 B2
(45) Date of Patent: *Sep. 4, 2012

(54) SOFTWARE TOOL FOR DETECTING PLAGIARISM IN COMPUTER SOURCE CODE

(75) Inventor: Robert M. Zeidman, Cupertino, CA (US)

(73) Assignee: Software Analysis and Forensic Engineering Corp., Cupertino, CA (US)

( * ) Notice: Subject to any disclaimer, the term of this patent is extended or adjusted under 35 U.S.C. 154(b) by 925 days.

This patent is subject to a terminal disclaimer.

(21) Appl. No.: 12/217,711

(22) Filed: Jul. 7, 2008

(65) Prior Publication Data

US 2008/0270991 A1 Oct. 30, 2008

Related U.S. Application Data

(63) Continuation of application No. 10/720,636, filed on Nov. 25, 2003, now Pat. No. 7,503,035.

(51) Int. Cl.
*G06F 9/44* (2006.01)
*G09B 19/00* (2006.01)
*G09B 25/00* (2006.01)

(52) U.S. Cl. .................... 717/123; 434/118; 434/367

(58) Field of Classification Search ............... 717/123
See application file for complete search history.

(56) References Cited

U.S. PATENT DOCUMENTS

| | | | | |
|---|---|---|---|---|
| 4,385,371 A * | 5/1983 | Shafer et al. | ............ | 365/49.17 |
| 6,658,648 B1 * | 12/2003 | Douceur et al. | ............ | 717/120 |
| 7,219,301 B2 * | 5/2007 | Barrie et al. | ............ | 715/751 |

OTHER PUBLICATIONS

Arnow, D. 1995. ":-)When you grade that: using e-mail and the network in programming courses", In Proceedings of the 1995 ACM Symposium on Applied Computing (Nashville, Tennessee, United States, Feb. 26-28, 1995). K. M. George, J. Carroll, and D. Oppenheim, Eds. SAC '95. ACM Press~New York, NY, 10-13.*
Paul Heckel, "A Technique for Isolating Differences Between Files," Communications of the ACM 21(4), Apr. 1978, pp. 264-268.*
Paul Clough, "Plagiarism in natural and programming languages: an overview of current tools and technologies," Research Memoranda, CS-00-05, University of Sheffield, UK, 2000.*
Verco and Wise, "Software for detecting suspected plagiarism: comparing structure and attribute-counting systems" 1996, ACM, ACSE '96 Proceedings of the 1st Australasian conference on Computer science education.*

* cited by examiner

*Primary Examiner* — James D Rutten
(74) *Attorney, Agent, or Firm* — Lowenstein Sandler PC

(57) ABSTRACT

A method and system for detecting plagiarism of software source code. In one embodiment, a first set of arrays and a second set of arrays are created for a first program source code file and a second program source code file respectively. Each pair of arrays in the first and second sets has entries corresponding to program elements of a distinct program element type such as functional program code, program comments, or program code identifiers. Next, each pair of arrays from the first and second sets is compared to find similar entries, and an intermediate match score is calculated for each pair of arrays based on the similar entries. Further, the resulting intermediate match scores are combined to produce a combined match score, which is then used to provide an indication of copying with respect to the first program source code file and the second program source code file.

28 Claims, 10 Drawing Sheets

```
/*    ---- begin    routine ----    */
void fdiv(
    char    *fname,    // file name
    char *path)        // path
{
    int Index1, j;                              ┌─── 601 while (1)
        j =    strlen(fname);
    /* find the file    extension */
```
(a) C source code snippet for file 1.                    ┌─── 602

```
SourceLines1[0]  =  ""              CommentLines1[0] = "---- begin routine ----"
SourceLines1[1]  =  "void fdiv"     CommentLines1[1] = ""
SourceLines1[2]  =  "char fname"    CommentLines1[2] = "file name"
SourceLines1[3]  =  "char path"     CommentLines1[3] = "path"
SourceLines1[4]  =  ""              CommentLines1[4] = ""
SourceLines1[5]  =  "int Index1 j"  CommentLines1[5] = ""
SourceLines1[6]  =  ""              CommentLines1[6] = ""
SourceLines1[7]  =  "while 1"       CommentLines1[7] = ""
SourceLines1[8]  =  "j strlen fname" CommentLines1[8] = ""
SourceLines1[9]  =  ""              CommentLines1[9] = "find the file extension"
```
(b) Source code and comment line arrays for file 1.

```
Word1[0]  =  "fdiv"
Word1[1]  =  "fname"
Word1[2]  =  "path"                 ┌─── 603
Word1[3]  =  "Index1"
```
(c) Array of unique identifiers (non-keywords) in file 1.

*Figure 6*

```
Word1[0] = "abc"          Word2[0] = "Aabc"
Word1[1] = "abc1"         Word2[1] = "aBc"
Word1[2] = "abc123"       Word2[2] = "abc1111111"
Word1[3] = "abcdef"       Word2[3] = "abcXXXyz"
Word1[4] = "pdq"          Word2[4] = "i"
Word1[5] = "xxx"          Word2[5] = "j"
Word1[6] = "xyz"          Word2[6] = "pdq"
Word1[7] = "yyy"          Word2[7] = "X"
```
(a) Non-keyword words in files 1 and 2. — 701

```
PartialWord[0] = "abc"
PartialWord[1] = "abc1"
PartialWord[2] = "xxx"
PartialWord[3] = "xyz"
```
(b) Matching partial words — 702

Figure 7

```
              File 1                              File 2
1   /* ---- begin routine ---- */    1   /* find the file extension */
2   void fdiv(                       2   void file_divide(
3       char *fname, // file name    3     char      *fname,
4       char *path)   /* path */     4     char      *path)
5   {                                5   {
6       int Index1, j;               6     int i, j;
7                                    7     while (1)       // loop here
8       while (1)                    8        j = strlen(fname);
9          j = strlen(fname);        9
10  // find the file extension       10
```
(a) Two files. — 801

```
              3/3
              4/4
              9/8
```
(b) Matching source lines in file1/file2 — 802

Figure 8

```
              File 1                                File 2
1    /* ---- begin routine ---- */      1    /* find the file extension */
2    void fdiv(                         2    void file_divide(
3        char *fname, // file name      3    char       *fname,
4        char *path)   /* path */       4    char       *path)      // path
5    {                                  5    {
6        int Index1, j;                 6      int i, j; /* ---- begin routine ---- */
7                                       7      while (1)      // loop here
8        while (1)                      8        j = strlen(fname);
9            j = strlen(fname);         9
10       // find the file extension     10     switch (x)
11       if (x == 5) {                  11     {
```
(a) Two files.

```
        1/6
        4/4
        10/1
```
(b) Matching comment lines in file1/file2

```
Comparing files in folder D:\CodeMatch\Code Development\test\C test 2\files 1
To files in folder D:\CodeMatch\Code Development\test\C test 2\files 2                  ─┤ 1101

D:\CodeMatch\Code Development\test\C test 2\files 1\bpf_dump.c        ─┤ 1102
Match Score  Compared To File
    2910     D:\CodeMatch\Code Development\test\C test 2\files 2\bpf_dump.c
     374     D:\CodeMatch\Code Development\test\C test 2\files 2\W32NReg.c
     374     D:\CodeMatch\Code Development\test\C test 2\files 2\test\W32NReg (variable names changed).c
     374     D:\CodeMatch\Code Development\test\C test 2\files 2\test\W32NReg (no comments).c D:\CodeMatch\Code Development\test\C test 2\files 1\bpf_filter.c      ─┤ 1103
Match Score  Compared To File
     606     D:\CodeMatch\Code Development\test\C test 2\files 2\W32NReg.c
     606     D:\CodeMatch\Code Development\test\C test 2\files 2\test\W32NReg (no comments).c
     572     D:\CodeMatch\Code Development\test\C test 2\files 2\test\W32NReg (variable names changed).c
     398     D:\CodeMatch\Code Development\test\C test 2\files 2\bpf_dump.c
```

Figure 11

Comparing file1: D:\CodeMatch\\test\C test 2\files 1\bpf_dump.c
To file2: D:\CodeMatch\ C test 2\files 2\test\W32Nreg.c — 1201

Matching source lines:

| File1 Line# | File2 Line# | Source line |
|---|---|---|
| 21 | 1 | #include <windows.h> |
| 22 | 3 | #include <stdio.h> |
| 24 | 7 | #include "WiNDIS.h" |

— 1202

Matching comment lines: — 1203

| File1 Line# | File2 Line# | Comment line |
|---|---|---|
| 3 | 3 | * The Regents of the University of California. All rights reserved. |
| 10 | 5 | * Redistribution and use in source and binary forms, with or without |

Longest matching semantic sequence: — 1204

File1 Line#   File2 Line#   Number of matching lines 21    1    3

— 1205

Matching words:

| stdio | WiNDIS | windows |
|---|---|---|

— 1206

Matching partial words:

| 0x | windows |
|---|---|

Figure 12

SOFTWARE TOOL FOR DETECTING PLAGIARISM IN COMPUTER SOURCE CODE

RELATED APPLICATIONS

This application is a continuation of U.S. patent application Ser. No. 10/720,636, now U.S. Pat. No. 7,503,035, filed Nov. 25, 2003, which is incorporated herein by reference.

BACKGROUND OF THE INVENTION

1. Field of the Invention

The present invention relates to software tools for comparing program source code files to determine the amount of similarity between the files and to pinpoint specific sections that are similar. In particular, the present invention relates to finding pairs of source code files that have been copied, in full or in part, from each other or from a common third file.

2. Discussion of the Related Art

Plagiarism detection programs and algorithms have been around for a number of years but have gotten more attention recently due to two main factors. One reason is that the Internet and search engines like Google have made source code very easy to obtain. Another reason is the growing open source movement that allows programmers all over the world to write, distribute, and share code. It follows that plagiarism detection programs have become more sophisticated in recent years. An excellent summary of available tools is given by Paul Clough in his paper, "Plagiarism in natural and programming languages: an overview of current tools and technologies." Clough discusses tools and algorithms for finding plagiarism in generic text documents as well as in programming language source code files. The present invention only relates to tools and algorithms for finding plagiarism in programming language source code files and so the discussion will be confined to those types of tools. Following are brief descriptions of four of the most popular tools and their algorithms.

The Plague program was developed by Geoff Whale at the University of New South Wales. Plague uses an algorithm that creates what is called a structure-metric, based on matching code structures rather than matching the code itself. The idea is that two pieces of source code that have the same structures are likely to have been copied. The Plague algorithm ignores comments, variable names, function names, and other elements that can easily be globally or locally modified in an attempt to fool a plagiarism detection tool.

Plague has three phases to its detection, as illustrated in FIG. 1:

In the first phase 101, a sequence of tokens and structure metrics are created to form a structure profile for each source code file. In other words, each program is boiled down to basic elements that represent control structures and data structures in the program.

In the second phase 102, the structure profiles are compared to find similar code structures. Pairs of files with similar code structures are moved into the next stage.

In the final stage 103, token sequences within matching source code structures are compared using a variant of the Longest Common Subsequence (LCS) algorithm to find similarity.

Clough points out three problems with Plague:

Plague is hard to adapt to new programming languages because it is so dependent on expert knowledge of the programming language of the source code it is examining. The tokens depend on specific language statements and the structure metrics depend on specific programming language structures.

The output of Plague consists of two indices H an HT that needs interpretation. While the output of each plagiarism detection program presented here relies on expert interpretation, results from Plague are particularly obscure.

Plague uses UNIX shell tools for processing, which makes it slow. This is not an innate problem with the algorithm, which can be ported to compiled code for faster processing.

There are other problems with Plague:

Plague is vulnerable to changing the order of code lines in the source code.

Plague throws out useful information when it discards comments, variable names, function names, and other identifiers.

The first point is a problem because code sections can be rearranged and individual lines can be reordered to fool Plague into giving lower scores or missing copied code altogether. This is one method that sophisticated plagiarists use to hide malicious code theft.

The second point is a problem because comments, variable names, function names, and other identifiers can be very useful in finding plagiarism. These identifiers can pinpoint copied code immediately. Even in many cases of intentional copying, comments are left in the copied code and can be used to find matches. Common misspellings or the use of particular words throughout the program in two sets of source code can help identify them as having the same author even if the code structures themselves do not match. As we will see, this is a common problem with these plagiarism tools.

The YAP programs (YAP, YAP2, YAP3) were developed by Michael Wise at the University of Sydney, Australia. YAP stands for "Yet Another Plague" and is an extension of Plague. All three version of YAP use algorithms, illustrated in FIG. 2, that can generally be described in two phases as follows:

In the first phase 201, generate a list of tokens for each source code file.

In the second phase 202, compare pairs of token files.

The first phase of the algorithm is identical for all three programs. The steps of this phase, illustrated in FIG. 2, are:

In step 203 remove comments and string constants.

In step 204 translate upper-case letters to lower-case.

In step 205, map synonyms to a common form. In other words, substitute a basic set of programming language statements for common, nearly equivalent statements. As an example using the C language, the language keyword "strncmp" would be mapped to "strcmp", and the language keyword "function" would be mapped to "procedure".

In step 206, reorder the functions into their calling order. The first call to each function is expanded inline and tokens are substituted appropriately. Each subsequent call to the same function is simply replaced by the token FUN.

In step 207, remove all tokens that are not specifically programming language keywords.

The second phase 202 of the algorithm is identical for YAP and YAP2. YAP relied on the sdiff function in UNIX to compare lists of tokens for the longest common sequence of tokens. YAP2, implemented in Perl, improved performance in the second phase 202 by utilizing a more sophisticated algorithm known as Heckel's algorithm. One limitation of YAP and YAP2 that was recognized by Wise was difficulty dealing with transposed code. In other words, functions or individual statements could be rearranged to hide plagiarism. So for YAP3, the second phase uses the Running-Karp-Rabin Greedy-String-Tiling (RKR-GST) algorithm that is more immune to tokens being transposed.

YAP3 is an improvement over Plague in that it does not attempt a full parse of the programming language as Plague does. This simplifies the task of modifying the tool to work with other programming languages. Also, the new algorithm is better able to find matches in transposed lines of code.

There are still problems with YAP3 that need to be noted:

In order to decrease the run time of the program the RKR-GST algorithm uses hashing and only considers matches of strings of a minimal length. This opens up the algorithm to missing some matches.

The tokens used by YAP3 are still dependent on knowledge of the particular programming language of the files being compared.

Although less so than Plague, YAP3 is still vulnerable to changing the order of code lines in the source code.

YAP3 throws out much useful information when it discards comments, variable names, function names, and other identifiers that can and have been used to find source code with common origins.

JPlag is a program, written in Java by Lutz Prechelt and Guido Malpohl of the University Karlsruhe and Michael Philippsen of the University of Erlangen-Nuremberg, to detect plagiarism in Java, Scheme, C, or C++ source code. Like other plagiarism detection programs, JPlag works in phases as illustrated in FIG. 3:

There are two steps in the first phase 301. In the first step 303, whitespace, comments, and identifier names are removed. As with Plague and the YAP programs, in the second step 304, the remaining language statements are replaced by tokens.

As with YAP3, the method of Greedy String Tiling is used to compare tokens in different files in the second phase 302. More matching tokens corresponds to a higher degree of similarity and a greater chance of plagiarism.

As can be seen from the description, JPlag is nearly identical in its algorithm to YAP3 though it uses different optimization procedures for reducing runtime. One difference is that JPlag produces a very nice HTML output with detailed plots comparing file similarities. It also allows the user to click on a file combination to bring up windows showing both files with areas of similarity highlighted. The limitations of JPlag are the same limitations that apply to YAP3 that have been listed previously.

The Measure of Software Similarity (MOSS) program was developed at the University of California at Berkeley by Alex Aiken. MOSS uses a winnowing algorithm. The MOSS algorithm can be described by these steps, as illustrated in FIG. 4:

In the first step 401, remove all whitespace and punctuation from each source code file and convert all characters to lower case.

In the second step 402, divide the remaining non-whitespace characters of each file into k-grams, which are contiguous substrings of length k, by sliding a window of size k through the file. In this way the second character of the first k-gram is the first character of the second k-gram and so on.

In the third step 403, hash each k-gram and select a subset of all k-grams to be the fingerprints of the document. The fingerprint includes information about the position of each selected k-gram in the document.

In the fourth step 404, compare file fingerprints to find similar files.

An example of the algorithm for creating these fingerprints is shown in FIG. 5. Some text to be compared is shown in part (a) 501. The 5-grams derived from the text are shown in part (b) 502. A possible sequence of hashes is shown in part (c) 503. A possible selection of hashes chosen to be the fingerprint for the text is shown in part (d) 504. The concept is that the hash function is chosen so that the probability of collisions is very small so that whenever two documents share fingerprints, it is extremely likely that they share k-grams as well and thus contain plagiarized code.

Of all the programs discussed here, MOSS throws out the most information. The algorithm attempts to keep enough critical information to flag similarities. The algorithm is also noted to have a very low occurrence of false positives. The problem using this algorithm for detecting source code plagiarism is that it produces a high occurrence of false negatives. In other words, matches can be missed. The reason for this is as follows:

By treating source code files like generic text files, much structural information is lost that can be used to find matches. For example, whitespace, punctuation, and upper-case characters have significant meaning in programming languages but are thrown out by MOSS.

Smaller k-grams increase the execution time of the program, but increase the sensitivity. MOSS makes the tradeoff of time for efficiency and typically uses a 5-gram. However, many programming language statements are less than 5 characters and can be missed.

Most of the k-grams are also thrown out, reducing the accuracy even further.

SUMMARY OF THE INVENTION

Plagiarism of software source code is a serious problem in two distinct areas of endeavor these days—cheating by students at schools and intellectual property theft at corporations. A number of methods have been implemented to check source code files for plagiarism, each with their strengths and weaknesses. One embodiment of the invention provides a method consisting of a combination of algorithms in a single tool to assist a human expert in finding plagiarized code. In some embodiments, two or more of the following algorithms are used to find plagiarism: Source Line Matching, Comment Line Matching, Word Matching, Partial Word Matching, and Semantic Sequence Matching.

Further features and advantages of various embodiments of the present invention are described in the detailed description below, which is given by way of example only.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 6 illustrates dividing a file of source code into source lines, comment lines, and words.

FIG. 7 illustrates matching partial words in a pair of files.

FIG. 8 illustrates matching source lines in a pair of files.

FIG. 11 shows a sample basic report output.

FIG. 12 shows a sample detailed report output.

DETAILED DESCRIPTION

Figure 1:
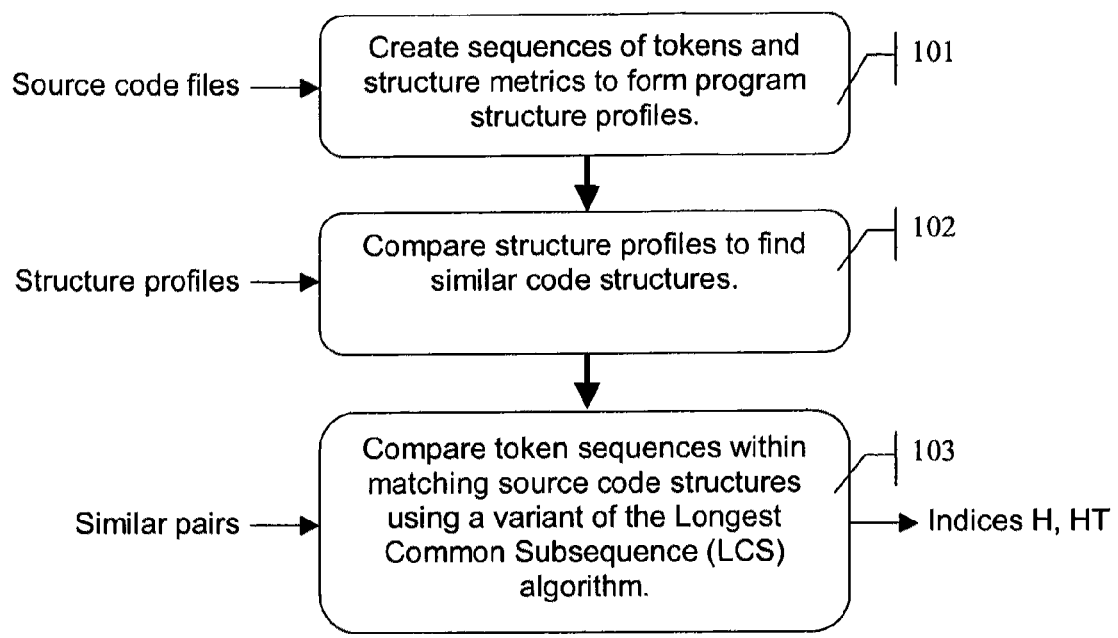
FIG. 1 illustrates the algorithm used by the Plague program for source code plagiarism detection.
Figure 2:
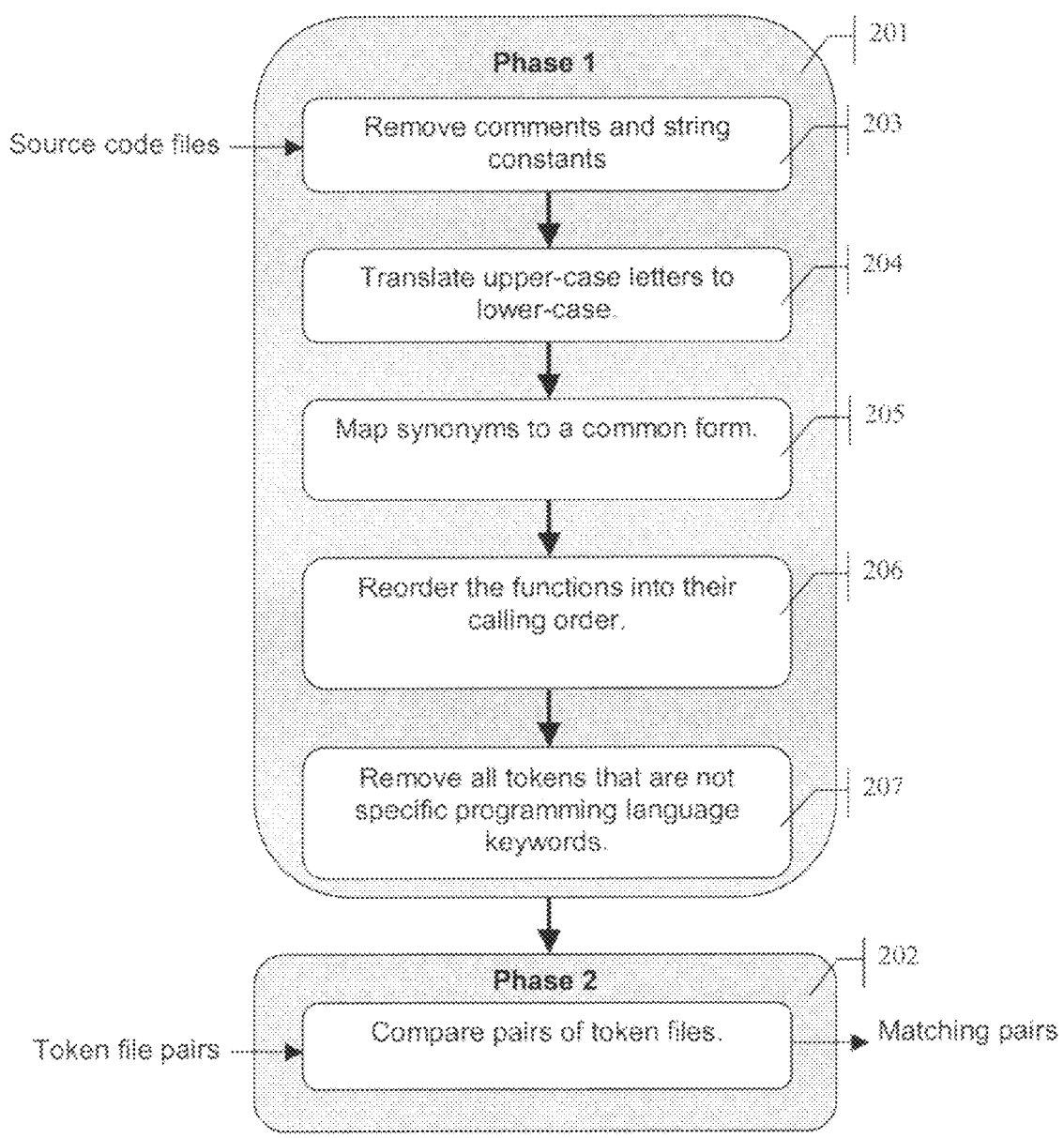
FIG. 2 illustrates the algorithm used by the YAP, YAP2, and YAP3 programs for source code plagiarism detection.
Figure 3:
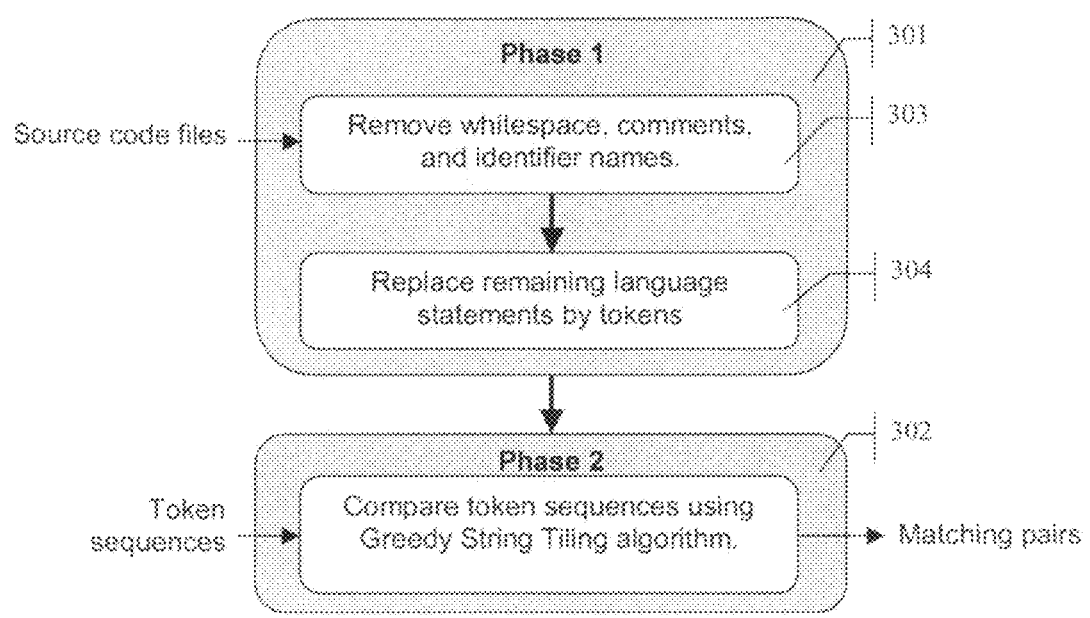
FIG. 3 illustrates the algorithm used by the JPlag program for source code plagiarism detection.
Figure 4:
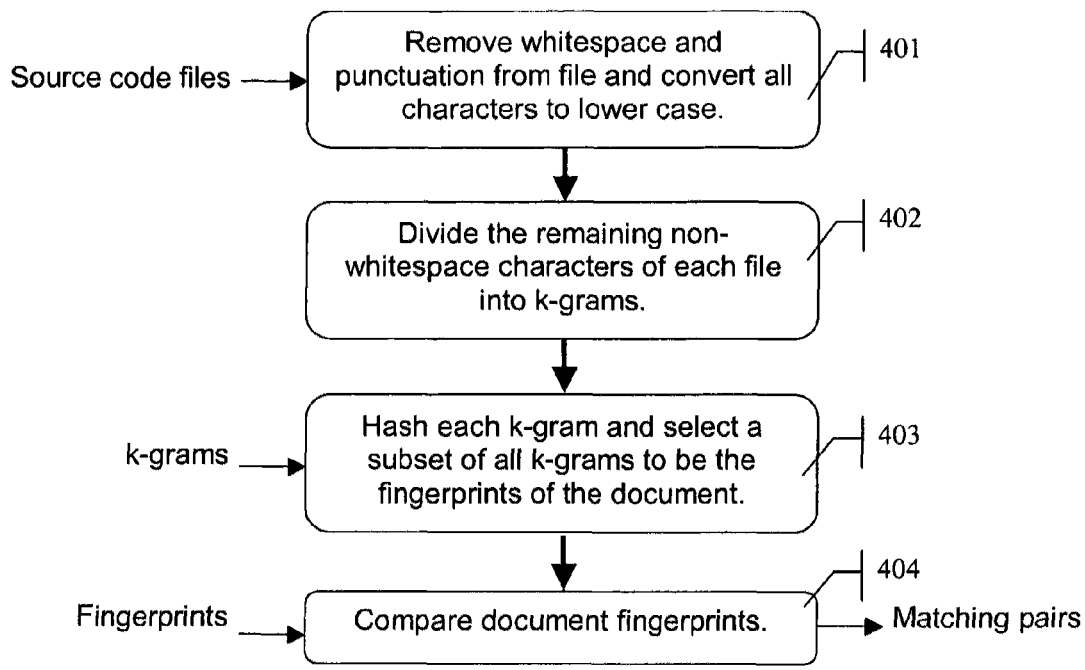
FIG. 4 illustrates the algorithm used by the MOSS program for source code plagiarism detection.
Figure 5:
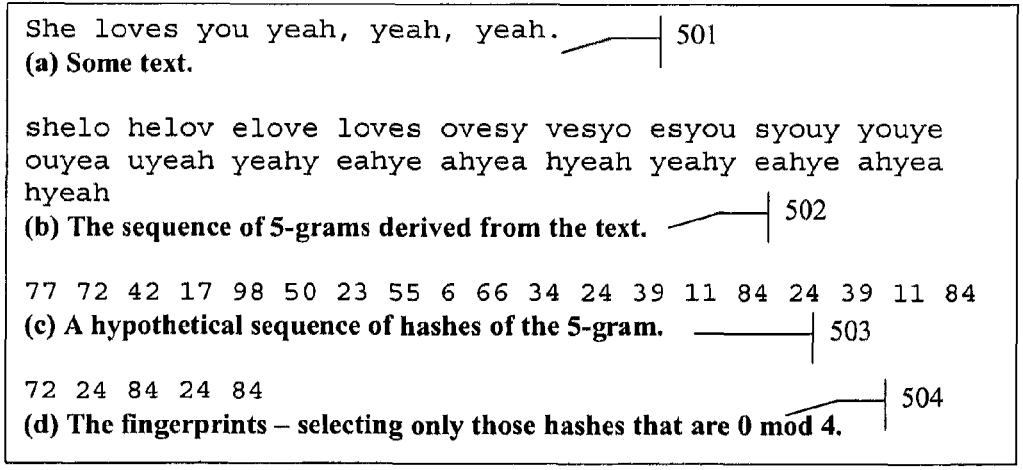
FIG. 5 illustrates the fingerprinting algorithm used by the MOSS program for source code plagiarism detection.

The present invention will be understood more fully from the detailed description given below and from the accompanying drawings of the preferred embodiment of the invention, which, however, should not be taken to limit the invention to the specific embodiment but are for explanation and understanding only.

The present invention takes a different approach to plagiarism detection than the programs described previously. The present invention compares features of each pair of source code files completely, rather than using a sampling method for comparing a small number of hashed samples of code. This may require a computer program that implements the present invention to run for hours or in some cases days to find plagiarism among large sets of large files. Given the stakes in many intellectual property theft cases, this more accurate method is worth the processing time involved. And it is certainly less expensive than hiring experts on an hourly basis to manually pore over code by hand.

The present invention makes use of a basic knowledge of programming languages and program structures to simplify the matching task. There is a small amount of information needed in the form of a list of common programming language statements that the present invention must recognize. This list is specific to the programming language being examined. In addition, the present invention needs information on characters that are used to identify comments and characters that are used as separators.

The present invention uses five algorithms to find plagiarism: Source Line Matching, Comment Line Matching, Word Matching, Partial Word Matching, and Semantic Sequence Matching. Each algorithm is useful in finding different clues to plagiarism that the other algorithms may miss. By using all five algorithms, chances of missing plagiarized code is significantly diminished. Before any of the algorithm processing takes place, some preprocessing is done to create string arrays. Each file is represented by three arrays—an array of source lines that consists of lines of functional source code and does not include comments, an array of comment lines that do not include functional source code, and an array of identifiers found in the course code. Identifiers include variable names, constant names, function names, and any other words that are not keywords of the programming language.

In one embodiment of the present invention, each line of each file is initially examined and two string arrays for each file are created: SourceLines1[ ], CommentLines1[ ] and SourceLines2[ ], CommentLines2[ ] are the source lines and comment lines for file 1 and file 2 respectively. Examples of these arrays are shown for a sample code snippet in FIG. 6. A sample snippet of a source code file to be examined is shown in part (a) 601. The separation of source lines and comments lines for the code snippet is shown in part (b) 602. Note that whitespace is not removed entirely, but rather all sequences of whitespace characters are replaced by a single space in both source lines and comment lines. In this way, the individual words are preserved in the strings. Separator characters such as {,}, and; are treated as whitespace. The comment characters themselves, in this case/*, */, and //, are stripped off from the comments. We are only interested in the content of each comment but not the layout of the comment. Special characters such as comment delimiters and separator characters are defined in a language definition file that is input to this embodiment of the present invention.

Note that blank lines are preserved as null strings in the array. This is done so that the index in each array corresponds to the line number in the original file and matching lines can easily be mapped back to their original files.

Next the source lines are examined from each file to obtain a list of all words in the source code that are not programming language keywords, as shown in part (c) 603 of FIG. 6. Note that identifier j is not listed as an identifier because all 1-character words are ignored as too common to consider. At this point, this embodiment of the present invention is ready to begin applying the matching algorithms.

Word Matching

For each file pair, this embodiment of the present invention uses a "word matching" algorithm to count the number of matching identifiers—identifiers being words that are not programming language keywords. In order to determine whether a word is a programming language keyword, comparison is done with a list of known programming language keywords. For example, the word "while" in a C source code file would be ignored as a keyword by this algorithm. In some programming languages like C and Java, keywords are case sensitive. In other programming languages like Basic, keywords are not case sensitive. This embodiment has a switch to turn case sensitivity on or off depending on the programming language being examined. So for a case sensitive language like C, the word "While" would not be considered a language keyword and would not be ignored. In a case insensitive language like Basic, the word "While" would be considered a language keyword and would be ignored. In either case, when comparing non-keyword words in the file pairs, case is ignored so that the word "Index" in one file would be matched with the word "index" in the other. This case-insensitive comparison is done to prevent being fooled by simple case changes in plagiarized code in an attempt to avoid detection.

This simple comparison yields a number w representing the number of matching identifier words in the source code of the pair of files. This number is determined by the equation $$w = \Sigma(A_i + f_N N_i) \text{ for } i=1 \text{ to } m_w$$

where $m_w$ is the number of case-insensitive matching non-keyword words in the two files, $A_i$ is the number of matching alphabetical characters in matching word i, $N_i$ is the number of matching numerals in matching word i, and $f_N$ is a fractional value given to matching numerals in a matching word. The reason for this fractional value is that alphabetical characters are less likely to match by chance, but numerals may match simply because they represent common mathematical constants—the value of pi for example—rather than because of plagiarism. Longer sequences of letters and/or numerals have a smaller probability of matching by chance and therefore deserve more consideration as potential plagiarism.

This algorithm tends to uncover code where common identifier names are used for variables, constants, and functions, implying that the code was plagiarized. Since this algorithm only eliminates standard programming language statements, common library routines that are used on both files will produce a high value of w. Code that uses a large number of the same library routines also has a higher chance of being plagiarized code.

Partial Word Matching

The "partial word matching" algorithm examines each identifier (non-keyword) word in the source code of one file of a file pair and finds all words that match a sequence within one or more non-keyword words in the other file of a file pair. Like the word matching algorithm, this one is also case insensitive. This algorithm is illustrated in FIG. 7. In part (a) 701, the non-keyword words from the two files are displayed. In part (b) 702, every word from one file that can be found as a sequence within a word from the other file is listed. So the identifier "abc" in file 1 can be found within identifiers "aabc", "abc1111111", and "abcxxxyz" in file 2. Note that identifier "pdq" is not listed in the array of partially matching words because it matches completely and was already considered in the word matching algorithm. Also note that identifier "x" is not listed in the array because 1-character words are ignored.

This algorithm works just like the word match algorithm on the list of partially matching words. It yields a number p representing the number of partially matching identifier words in the source code of the pair of files. This number is determined by the equation $$p = \Sigma (A_i + f_N N_i) \text{ for } i=1 \text{ to } m_p$$

where $m_p$ is the number of case-insensitive matching partial words in the two files, $A_i$ is the number of matching alphabetical characters in matching partial word i, $N_i$ is the number of matching numerals in matching partial word i, and $f_N$ is a fractional value given to matching numbers in a matching partial word.

Source Line Matching

The "source line matching" algorithm compares each line of source code from both files, ignoring case. We refer to functional program language lines as source lines and exclude comment lines. Also, sequences of whitespace are converted to single spaces so that the syntax structure of the line is preserved. Note that a line of source code may have a comment at the end, in which case the comment is stripped off for this comparison. Source lines that contain only programming language keywords are not examined. For source lines to be considered matches, they must contain at least one non-keyword such as a variable name or function name. Otherwise, lines containing basic operations would be reported as matching. FIG. 8 illustrates this algorithm. Part (a) 801 shows the lines of two files along with line numbers. Part (b) 802 shows the source line numbers in the two files that are considered matching.

This algorithm yields a number s representing the number of matching source lines in the pair of files.

Comment Line Matching

Figure 9:
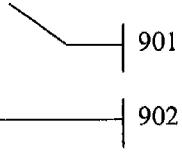
FIG. 9 illustrates matching comment lines in a pair of files.

The "comment line matching" algorithm compares each line of comments from both files, again ignoring case. Note that a line of source code may have a comment at the end. The source code is stripped off for this comparison, leaving only the comment. The entire comment is compared, regardless of whether there are keywords in the comment or not. FIG. 9 shows two files along with line numbers and the comment lines that are considered matching. Part (a) 901 shows the lines of two files along with line numbers. Part (b) 902 shows the comment line numbers in the two files that are considered matching.

This algorithm yields a number c representing the number of matching comment lines in the pair of files.

Semantic Sequence Matching

The "semantic sequence" algorithm compares the first word of every source line in the pair of files, ignoring blank lines and comment lines. This algorithm finds sequences of code that appear to perform the same functions despite changed comments and identifier names. The algorithm finds the longest common semantic sequence within both files. Look at the example code in FIG. 9 part (a) 901. In this case, the semantic sequence of lines 2 through 9 in file 1 matches the semantic sequence of lines 2 through 8 in file 2 because the first word in each non-blank line in file 1 is identical to the first word of the corresponding line in file 2. There are 6 source lines in this sequence, so the algorithm yields a value of 6. If a longer sequence of source lines is found in the file, this algorithm returns the number of source lines in the longer sequence. This algorithm yields a number q representing the number of lines in the longest matching semantic sequence in the pair of files.

Match Score

Figure 10:
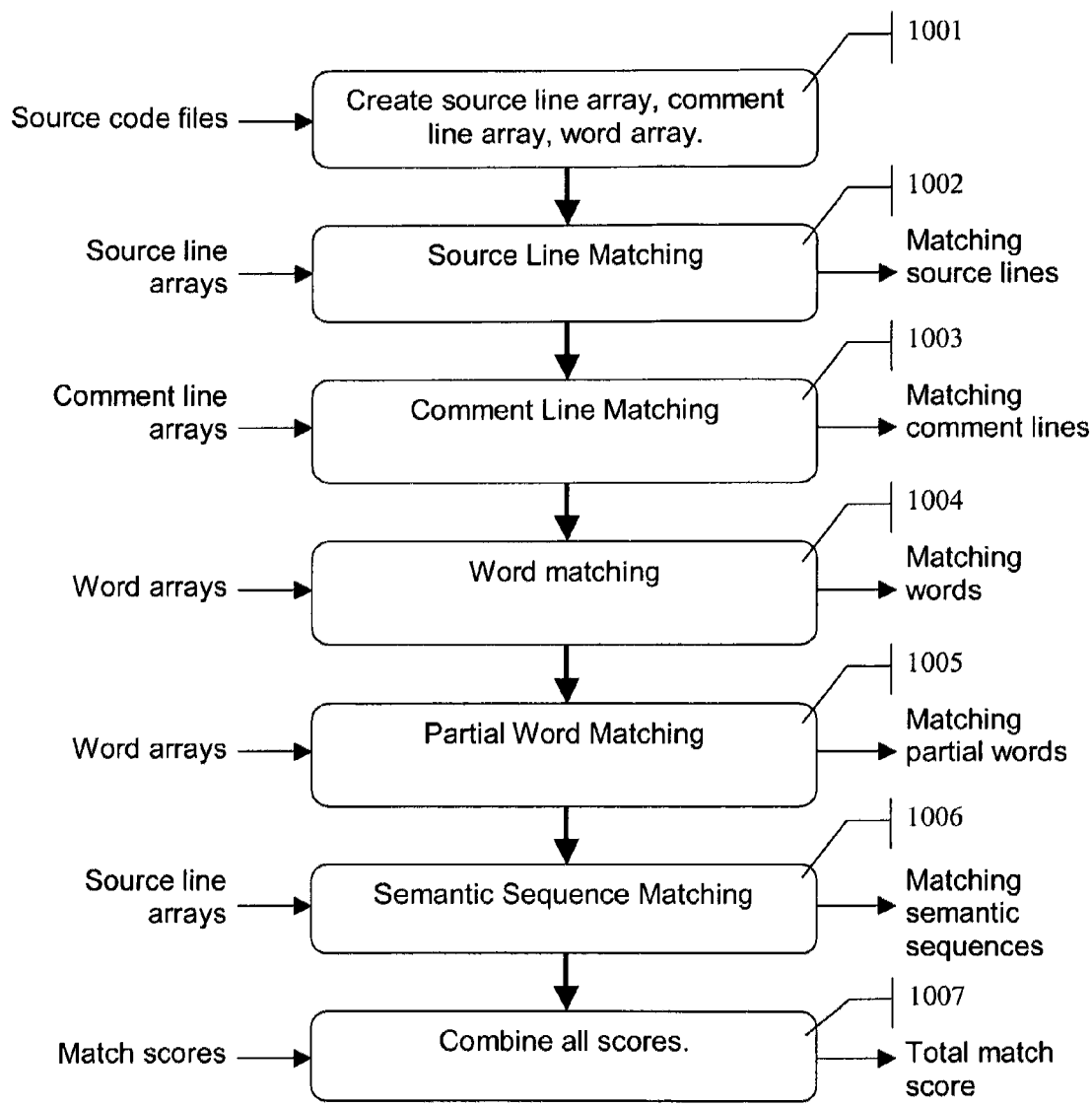
FIG. 10 illustrates the sequence of algorithms comprising the present invention.

The entire sequence, applying all five algorithms, is shown in FIG. 10. In the first step 1001, the source line, comment line, and word arrays for the two files to be created are created. In the second step 1002, the source line arrays of the two files are compared using the source line matching algorithm. In the third step 1003, the comment line arrays of the two files are compared using the comment line matching algorithm. In the fourth step 1004, the word arrays of the two files are compared using the word matching algorithm. In the fifth step 1005, the word arrays of the two files are compared using the partial word matching algorithm. In the sixth step 1006, the source line arrays of the two files are compared using the semantic sequence matching algorithm. Although all matching algorithms produce output for the user, in the seventh step 1007, the results of all matching algorithms are combined into a single match score.

The single match score t is a measure of the similarity of the file pairs. If a file pair has a higher score, it implies that these files are more similar and may be plagiarized from each other or from a common third file. This score, known as a "total match score," is given by the following equation.

$$t = k_w w + k_p p + k_s s + k_c c + k_q q$$

In this equation, each of the results of the five individual algorithms is weighted and added to give a total matching score. These weights must be adjusted to give the optimal results. There is also a sixth weight that is hidden in the above equation and must also be evaluated. That weight is $f_N$, the fractional value given to matching numerals in a matching word or partial word. Thus the weights that must be adjusted to get a useful total matching score are:

$f_N$ the fractional value given to matching numerals in a matching word or partial word $k_w$ the weight given to the word matching algorithm $k_p$ the weight given to the partial word matching algorithm $k_s$ the weight given to the source line matching algorithm $k_c$ the weight given to the comment line matching algorithm $k_q$ the weight given to the semantic sequence matching algorithm These numbers are adjusted by experimentation over time to give the best results. However, unlike the other programs described in this paper, this invention is not intended to give a specific cutoff threshold for file similarity. There are many kinds of plagiarism and many ways of fooling plagiarism detection programs. For this reason, this embodiment of the present invention produces a basic HTML output report with a list of file pairs ordered by their total match scores as shown in FIG. 11. This basic report includes a header 1101 and a ranking of file pair matches for each file as shown in 1102 and 1103. Each match score shown is also a hyperlink.

The user can click on a match score hyperlink to bring up a detailed HTML report showing exact matches between the selected file pairs. In this way, experts are directed to suspicious similarities and allowed to make their own judgments. A sample detailed report is shown in FIG. 12. The report includes a header 1201 that tells which files are being compared. The exact matching source lines and the corresponding line numbers are given in the next section 1202. The exact matching comment lines and the corresponding line numbers are given in the next section 1203. The number of lines in the longest matching semantic sequence and the beginning line numbers for the sequence in each file are given in the next section 1204. The matching words in the files are shown in the next section 1205. The matching partial words in the files are shown in the next section 1206.

The present invention is not a tool for precisely pinpointing plagiarized code, but rather a tool to assist an expert in finding plagiarized code. The present invention reduces the effort needed by the expert by allowing him to narrow his focus from hundreds of thousands of lines in hundreds of files to dozens of lines in dozens of files.

Various modifications and adaptations of the operations that are described here would be apparent to those skilled in the art based on the above disclosure. Many variations and modifications within the scope of the invention are therefore possible. The present invention is set forth by the following claims.

The invention claimed is:

1. A computer-implemented method comprising:
   creating, by a computing device executing a detector, a first array based on a first program source code file including a plurality of program elements, the first array having entries corresponding to lines of functional program code from the first program source code file;
   creating, by the computing device, a second array based on a second program source code file including a plurality of program elements, the second array having entries corresponding to lines of functional program code from the second program source code file;
   comparing first words in entries of the first array with first words in entries of the second array while ignoring subsequent words in the entries of the first array and in the entries of the second array;
   finding a longest sequence of similar entries between the first array and the second array based on the comparing of the first words in the entries of the first array with the first words in the entries of the second array;
   calculating a match score based on a number of lines in the longest sequence; and
   providing an indication of copying with respect to the first program source code file and the second program source code file, wherein the indication of copying is defined by the match score.

2. The method of claim 1 wherein providing an indication of copying with respect to the first program source code file and the second program source file comprises:
   presenting a report identifying the first program source file and the second program source code file, and the match score calculated based on the comparison; and
   allowing a user to select the match score to view the similar entries.

3. The method of claim 1 wherein the first and second arrays are created based on program dependent information.

4. A computer-implemented method comprising:
   creating, by a computing device executing a detector, a first set of arrays based on a first program source code file including a plurality of program elements;
   creating, by the computing device, a second set of arrays for a second program source code file;
   comparing the arrays of the first set with the arrays of the second set to find similar entries;
   calculating a plurality of intermediate match scores based on the similar entries, the plurality of intermediate match scores including a first intermediate match score calculated based on comparing a first array of the first set of arrays with a second array of the second set of arrays to find entries in the first array that contain similar first words as entries in the second array while ignoring subsequent words in the entries;
   combining the plurality of intermediate match scores to produce a combined match score; and
   providing an indication of copying with respect to the first program source code file and the second program source code file, wherein the indication of copying is defined by the combined match score.

5. The method of claim 4 wherein the plurality of intermediate match scores are combined using corresponding weights.

6. The method of claim 4 wherein providing an indication of copying with respect to the first program source code file and the second program source file comprises:
   presenting a report identifying the first program source file and the second program source code file, and the match score calculated based on the comparison; and
   allowing a user to select the match score to view the similar entries.

7. The method of claim 4 wherein the first and second sets of arrays are created based on program dependent information.

8. The method of claim 4 wherein calculating a second intermediate match score of the plurality of intermediate match scores comprises finding a number of matching lines in the first array and the second array.

9. The method of claim 8 wherein the first array is a first functional program code array and the second array is a second functional program code array, and wherein matching lines in the first functional program code array and the second functional program code array exclude lines consisting entirely of programming keywords.

10. The method of claim 4, wherein calculating the plurality of intermediate match scores comprises calculating a second intermediate match score for a first program comments array of the first set of arrays and a second program comments array of the second set of arrays to find a number of matching comment lines in the first program comments array and the second program comments array.

11. The method of claim 4 wherein:
    an array from the first set and an array from the second set have a program element type represented by program code identifiers;
    at least some of the similar entries comprise similar program code identifiers; and
    calculating an intermediate match score comprises computing a number of the similar program code identifiers.

12. The method of claim 11 wherein calculating an intermediate match score further comprises combining a number of alphabetical characters in the similar program code identifiers and a fraction of a number of numerical characters in the similar program code identifiers.

13. The method of claim 4 wherein the first array is a first functional program code array and the second array is a second functional program code array, and wherein:
    comparing the first functional program code array with the second functional program code array comprises finding a longest sequence of similar entries, wherein at least some similar entries are different from one another but perform logically equivalent functions; and
    calculating the first intermediate match score comprises finding a number of lines contained in the longest sequence.

14. The method of claim 13, wherein an order of found entries in the first functional program code array corresponds to an order of entries with the similar first words in the second functional program code array.

15. A computer-readable storage medium storing executable instructions to cause a computer system to perform a method comprising:
creating, by a computing device executing a detector, a first set of arrays based on a first program source code file including a plurality of program elements;
creating, by the computing device, a second set of arrays for a second program source code file;
comparing the arrays of the first set with the arrays of the second set to find similar entries;
calculating a plurality of intermediate match scores based on the similar entries, the plurality of intermediate match scores including a first intermediate match score calculated based on comparing a first array of the first set of arrays with a second array of the second set of arrays to find entries in the first array that contain similar first words as entries in the second array while ignoring subsequent words in the entries;
combining the plurality of intermediate match scores to produce a combined match score; and
providing an indication of copying with respect to the first program source code file and the second program source code file, wherein the indication of copying is defined by the combined match score.

16. The computer-readable storage medium of claim 15 wherein the plurality of intermediate match scores are combined using corresponding weights.

17. The computer-readable storage medium of claim 15 wherein the first array is a first functional program code array and the second array is a second functional program code array, and wherein:
calculating a second intermediate match score comprises finding a number of matching lines of functional program code in the first functional program code array and the second functional program code array; and
calculating a third intermediate match score comprises finding a number of matching comment lines in a first program comments array of the first set of arrays and a second program comments array of the second set of arrays.

18. The computer-readable storage medium of claim 15 wherein:
an array from the first set and an array from the second set have a program element type represented by program code identifiers;
at least some of the similar entries comprise similar program code identifiers; and
calculating an intermediate match score comprises computing a number of the similar program code identifiers.

19. The method of claim 18 wherein calculating an intermediate match score further comprises combining a number of alphabetical characters in the similar program code identifiers and a fraction of a number of numerical characters in the similar program code identifiers.

20. The computer-readable storage medium of claim 15 wherein the first array is a first functional program code array and the second array is a second functional program code array, and wherein:
comparing the first functional program code array and the second functional program code array comprises finding a longest sequence of similar entries, wherein at least some similar entries are different from one another but perform logically equivalent functions; and
calculating the first intermediate match score comprises finding a number of lines contained in the longest sequence.

21. The computer-readable storage medium of claim 15 wherein providing an indication of copying with respect to the first program source code file and the second program source file comprises:
presenting a report identifying the first program source file and the second program source code file, and the match score calculated based on the comparison; and
allowing a user to select the match score to view the similar entries.

22. The computer-readable storage medium of claim 15 wherein the first and second sets of arrays are created based on program dependent information.

23. The computer-readable storage medium of claim 15 wherein calculating a second intermediate match score of the plurality of intermediate match scores comprises finding a number of matching lines in the first array and the second array.

24. The computer-readable storage medium of claim 23 wherein the first array is a first functional program code array and the second array is a second functional program code array, and wherein matching lines in the first functional program code array and the second functional program code array exclude lines consisting entirely of programming keywords.

25. The computer-readable storage medium of claim 15 wherein calculating the plurality of intermediate match scores comprises calculating a second intermediate match score for a first program comments array of the first set of arrays and a second program comments array of the second set of arrays to find a number of matching comment lines in the first program comments array and the second program comments array.

26. A computer-readable storage medium storing executable instructions to cause a computer system to perform a method comprising:
creating, by the computer system, a first array on a first program source code file including a plurality of program elements, the first array having entries corresponding to lines of functional program code from the first program source code file;
creating, by the computer system, a second array based on a second program source code file including a plurality of program elements, the second array having entries corresponding to lines of functional program code from the second program source code file;
comparing first words in entries of the first array with first words in entries of the second array while ignoring subsequent words in the entries of the first array and in the entries of the second array;
finding a longest sequence of similar entries between the first array and the second array based on the comparing of the first words in the entries of the first array with the first words in the entries of the second array;
calculating a match score based on a number of lines in the longest sequence; and
providing an indication of copying with respect to the first program source code file and the second program source code file, wherein the indication of copying is defined by the match score.

27. The computer-readable storage medium of claim 26 wherein providing an indication of copying with respect to the first program source code file and the second program source file comprises:

presenting a report identifying the first program source file and the second program source code file, and the match score calculated based on the comparison; and allowing a user to select the match score to view the similar entries.

28. The computer-readable storage medium of claim 26 wherein the first and second arrays are created based on program dependent information.

* * * * *